Nov. 1, 1955 F. C. MITCHELL 2,722,142
POWER OPERATED SWAGES FOR BAND SAWS
Filed June 13, 1952 3 Sheets-Sheet 1
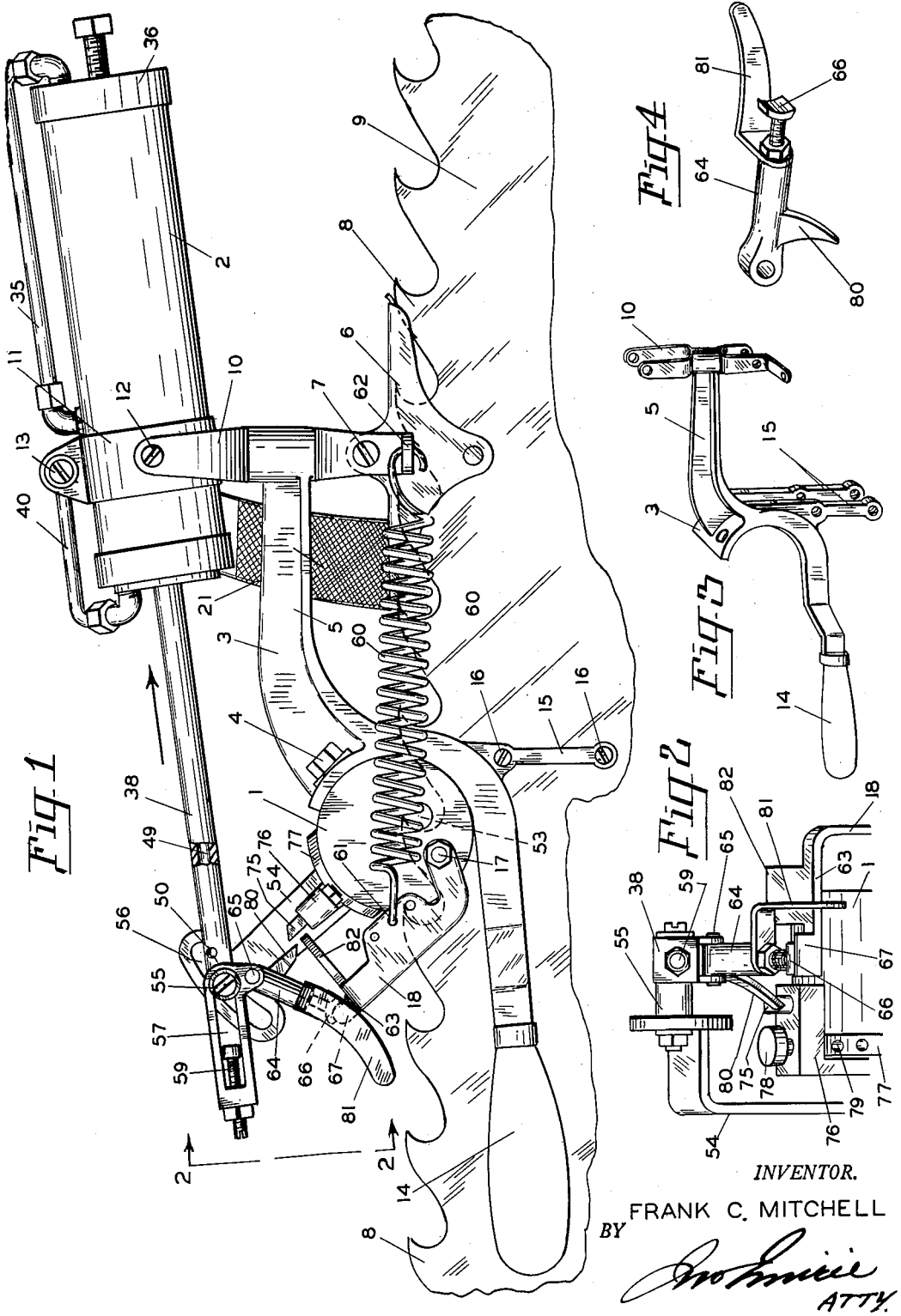
INVENTOR.
FRANK C. MITCHELL
BY
ATTY.

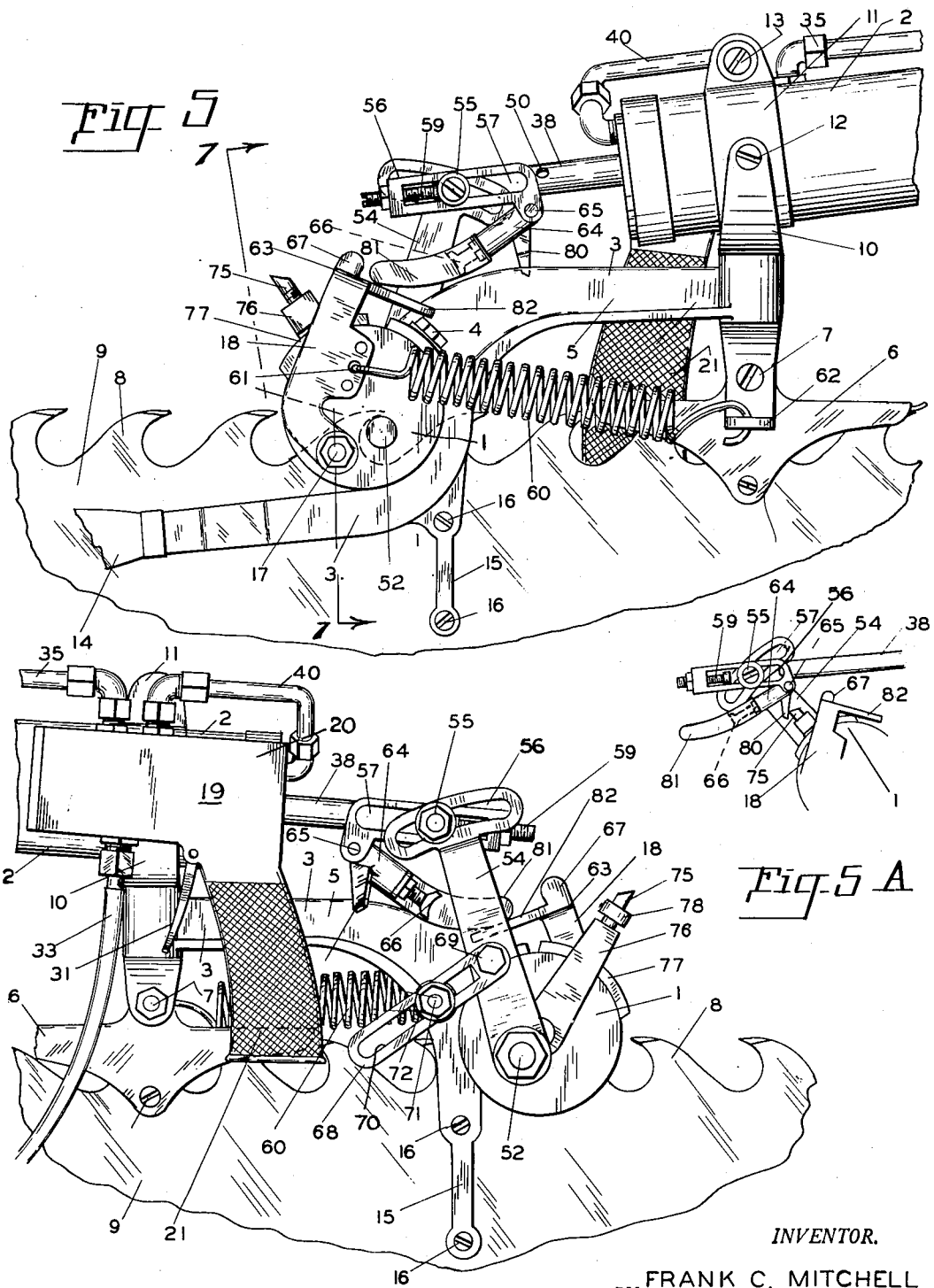

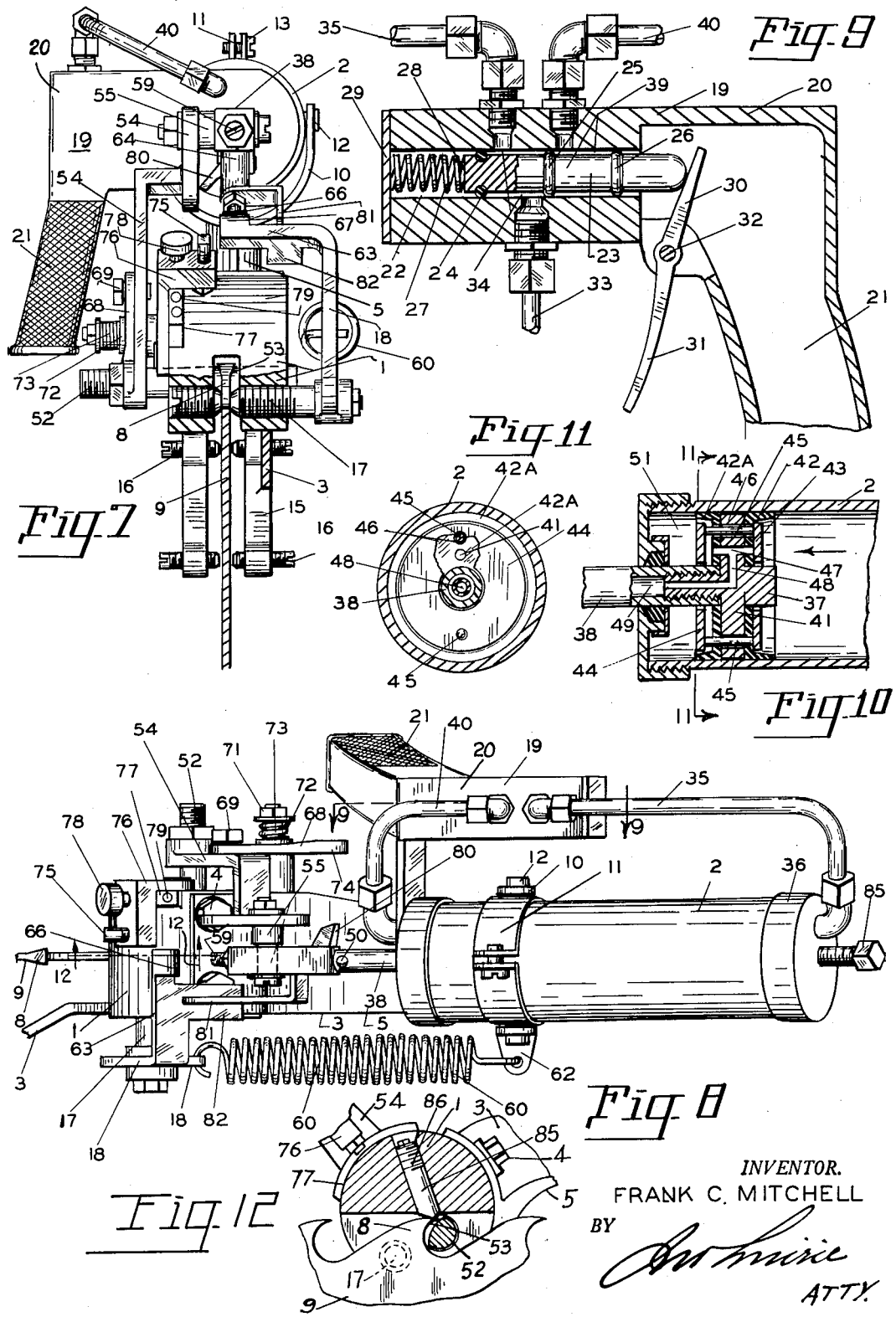

2,722,142
Patented Nov. 1, 1955

UNITED STATES PATENT OFFICE

2,722,142

POWER OPERATED SWAGES FOR BAND SAWS

Frank C. Mitchell, Prospect, Oreg.

Application June 13, 1952, Serial No. 293,281

11 Claims. (Cl. 76—52)

My invention relates to power operated swages, more particularly to such swages that are adapted for the swaging of band saws.

The primary object of this invention is to provide means for operating by compressed air power the simple type saw swage that is now operated by hand.

In the operation of my new and improved compressed air operated swage, the operator places the swage in position on the saw tooth. Then, by simply operating a control trigger, the swage is locked to the tooth being swaged, after which the same air cylinder operates the swaging dies of the swage. After the swaging operation takes place, the operator releases the control trigger and the swage is then released from the tooth ready to be moved to the next tooth to be swaged.

By the use of my new and improved power operated swage, a more accurate swaging operation takes place, due to the fact that the operator exerts no manual pressure against the swage in locking the same to the tooth of the saw.

These and other incidental objects will be apparent in the drawings, specification and claims.

Referring to the drawings:

Figure 1 is a side view of my new and improved compressed air operated swage mounted on a conventional band saw in released position.

Figure 2 is a fragmentary detailed view, taken on line 2—2 of Figure 1, illustrating the mechanism for controlling the clamping lever.

Figure 3 is a perspective view of the frame for adapting the power operated mechanism to a simple hand swage.

Figure 4 is a perspective view of the clamp release and locking mechanism.

Figure 5 is a side view similar to Figure 1, except that the swage is shown in a position after completing the swaging of the tooth.

Figure 5A is a fragmentary view of the clamp release in released position, permitting the clamping screw to grip the tooth to be swaged.

Figure 6 is a side view of the swage from the opposite side of that shown in Figure 5.

Figure 7 is a sectional view, taken on line 7—7 of Figure 5, parts being broken away for convenience of illustration.

Figure 8 is a plan view of the swage in the position shown in Figure 5.

Figure 9 is a sectional view, taken on line 9—9 of Figure 8, of the control valve mechanism.

Figure 10 is a fragmentary longitudinal sectional view of the operating air cylinder and its piston.

Figure 11 is a transverse sectional view, taken on line 11—11 of Figure 10.

Figure 12 is a fragmentary sectional view taken on line 12—12 of Figure 8.

My invention comprises an apparatus for operating a simple hand swage 1 by an air cylinder 2. I provide a frame 3, as best illustrated in Figure 3, which is bolted to the swage 1 by the bolts 4. The frame 3 consists of a holding or stabilizing arm 5 extending horizontally forward of the swage 1.

The usual supporting member 6 is pivotally connected to the outer end of the arm 5 at 7. This member rides on the top of the teeth 8 of the band saw 9, supporting and stabilizing the arm 5 which in turn holds the swage 1 in its working position relative to the saw.

The air cylinder 2 is supported by the yoke 10, forming part of the outer end of the arm 5 by way of the clamping ring 11, which is pivotally mounted to the yoke 10 at 12. The clamping ring 11 is clamped around the cylinder 2 by the set screw 13 and provides a means of positioning the cylinder 2 in regards to the swage 1, depending upon the type of saw being swaged.

The frame 3 also consists of a handle 14 to be held by the operator for lifting the swage from one tooth to the other. The frame 3 has downwardly extending legs or guides 15 straddling the saw and adapted to hold the swage assembly in alignment with the saw. Set screws 16 are provided for adjusting the clearance between the guides and the various thickness of saws being conditioned, as it is desirable to eliminate tilting of the swage on the saw.

Referring to Figure 7, the swage 1 straddles the teeth 8 of the saw and is locked to the individual tooth by the clamping screw 17. In hand swages, the clamping screw is operated by a hand lever, which I have removed and replaced with the mechanically operated lever 18.

When the lever 18 is in the position shown in Figure 1, the clamping screw 17 is released from the tooth, permitting the swage to be moved from one tooth to another. When the lever 18 is in the position shown in Figures 5, 6, 7 and 8, the clamping screw is cinched up against the tooth of the saw, holding the swage while the swaging operation takes place.

Referring to Figure 9, I show a sectional view of the air control and distributing valve 19, which consists of a frame 20 on which a handle 21 is formed. The valve unit 19 has a cylinder 22 running longitudinally thereof and adapted to have a plunger 23 operating therein. The plunger 23 has seals 24, 25 and 26 disposed between the said plunger and the inside of the cylinder 22, providing an air seal between the said seals.

A spring 27 bears against the end 28 of the plunger 23 and the cap 29, forcing the plunger to the right against the arm 30 of the operating trigger 31, which is pivotally mounted at 32 on the valve frame 20. When the plunger is in the position shown in Figure 9, it receives an air supply from the piping 33 into the space 34 between the seals 24 and 25.

From this space it is delivered by the piping 35 to the cylinder head 36, referring to Figure 8. This forces the piston 37, referring to Figure 10, and the piston rod 38 to the position shown in Figure 1. Air pressure will hold the piston in this position until the trigger 31 is operated, forcing the plunger 23 against the spring 27, at which time air will enter the space 39 between the seals 25 and 26, which delivers the said air out through the piping 40 against the opposite side of the piston 37 moving the piston rod to the position shown in Figures 5, 6, 7 and 8.

When the trigger 31 is released, the spring 27 will return the plunger to the position shown in Figure 9, which will again force the piston to the position shown in Figure 1.

I will now describe how the air is exhausted from the cylinder 2 in the operation of the piston therein. Referring to Figure 10, I illustrate the body 41 of the piston 37 forming part of the piston rod 38. Air seal cups 42 and 42A are fixedly secured to either side of the piston by any suitable means. Located on either side of the seals 42 and 42A are washers 43 and 44. These washers are connected together by the spacer pins 45. These pins pass through the openings 46 of the piston, spacing the washers 43 and 44 apart.

A port 47 passes through the body 41 of the piston and through the seal cups 42 and 42A. Leading from the port 47 is a port 48. The piston rod 38 has a passage 49 extending therethrough in communication with the port 48 and terminating in an exhaust port 50 adjacent the outer end of said rod, as shown in Figures 1, 5 and 8. When air is applied against the piston on either side thereof, the air from the opposite side of the piston is exhausted through the port 50. Upon admission of air under pressure through the pipe 35 into the end 36 of the cylinder 2, the air pressure, in the direction of the arrow in Figure 10, presses the washer 43 against the cup seal 42 which closes the respective end of the port 47. The spacer pins 45 are driven by the washer 43 and force the washer 44 from the cup seal or gasket 42A and thereby open the end of the port 47 opening through the cup seal 42A, permitting the air in the end 51 of the cylinder to be rapidly exhausted through the ports 47 and 48, passage 49 and port 50. When air under pressure is applied to the opposite side of the piston, the washer 44 is moved to close the respective end of the port 47 and the washer 43 is moved by the pins 45 to open the respective end of the port 47, permitting the rapid exhaust of the air in the end 36 of the cylinder through the ports 47 and 48, passage 49 and port 50.

Referring to Figures 6, 7 and 8 in particular, the shaft 52, which forms part of the die 53 for swaging the saw teeth is operated by a lever 54, which is fixedly secured to the shaft 52. A crank pin 55 is fixedly located in the desired position within the slot 56 formed on the outer end of the lever 54. The outer end of the piston rod 38 has a guideway or slot 57 formed thereon and adapted to embrace the crank pin 55 in such a manner as to permit the pin to work freely within the slot 57, the stroke of the pin being governed by the set screw 59.

A link 68 is connected at one end by a pivot 69 with the lever 54, as best shown in Figure 6, the link having a slot 70 which straddles a stationary bolt 71 on the frame 5. A friction washer 72, on the bolt 71, is biased against the link 68 by a tension spring 73, Figures 7 and 8, and resists movement of the link 68 and lever 54. The free end portion 74 of the link is thicker than the balance of the link, whereby the friction between the washer 72 and link 68 is increased to offer greater resistance to movement of the lever 54 as it approaches retracted position, shown in Figure 1.

A spring 60 is connected to the clamping lever 18 at 61 and to the outer end of the stabilizing arm 5 at 62. This spring is selectively adjusted to apply sufficient pull on the arm 18 to tighten the clamping screw 17 against the teeth of the saw for holding the swage while the swaging of the tooth takes place. The lever 18 is moved to and held in the position for releasing the clamping screw 17, as shown in Figure 1, by means of a push rod 64, Figure 4, which is carried by the piston rod 38 and is operatively engageable with the free end 63 of the lever 18. The push rod 64 is pivotally connected at 65 to the outer end portion of the piston rod 38 and has a foot 66 adapted to engage a shoulder 67 on the free end portion 63 of the lever 18 when the piston rod is extended from the cylinder, as shown in Figure 1, for moving and holding the lever 18 in release position in opposition to the spring 60.

The swage body 1 is provided with a quadrant 77 having a plurality of radial holes 79, and an arm 76 is pivotally mounted on the swage body 1 for arcuate movement relative to the quadrant. The arm 76 carries a pawl 75 and a plunger 78 for selective insertion in one of the holes 79 to selectively position said pawl. The push rod 64 has a depending lug 80 for engagement with said pawl 75 to lift the foot 66 from the shoulder 67 to free the lever 18. The push rod 64 also has a longitudinally extending arm 81 that rides on a cam portion 82, on the free end 63 of the lever 18, for guiding the foot 66 into abutment with the shoulder 67.

I will now describe the operation of my new and improved pneumatically operated swage. The handle 14 is grasped by the right hand of the operator, while the handle 21 is grasped by the left hand. He positions the swage over the teeth 8 of the saw, pulling the die 53 of the swage back against the face of a tooth, as shown in Figure 12. He then pulls the trigger 31, which moves the plunger 23 to admit air into the piping 40, referring to Figure 9, which pushes the piston 37 towards the end 36 of the cylinder 2, pulling the piston rod 38 therewith.

The slot 57 in the end of the piston rod 38 travels along the crank pin 55, the lever 54 being held stationary by the friction between the washer 72 and the link 68, as illustrated in Figure 5A. At the beginning of the travel of the rod 38, the arm 80 of the push rod 64 engages the stationary pawl 75, which swings said push rod about its pivot 65, raising the foot 66 above the shoulder 67 and freeing the lever 18. When free, the lever 18 is pulled by the spring 60 to the position shown in Figures 5, 6, 7 and 8 applying the clamping screw 17 to the tooth 8 of the saw, as shown in Figure 7.

As the piston rod 38 continues to move forward, the adjusting screw 59 within the slot 57 contacts the crank pin 55 pulling the lever 54 to the position shown in Figures 5, 6, 7 and 8, revolving the die shaft 52 and die 53, swaging the tooth in the usual manner.

Upon release of the trigger 31, the spring 27 biases the plunger 23 to the position shown in Figure 9, reversing the movement of the piston rod 38. As the piston rod 38 is expelled from the cylinder 2, the arm 81 of the push rod 64 rides on the cam 82 of the lever 18, guiding the foot 66 of the push rod into abutment with the shoulder 67. When the foot contacts the shoulder, it moves the lever 18 to the release position shown in Figure 1. Moreover, upon reversal of the piston rod 38, the set screw 59 is retracted from the crank pin 55 of the lever 54, which remains stationary until the pin is engaged by the opposite end of the slot 57, whereupon the lever 54 is returned to the position shown in Figure 1.

During the stroke of the pin 55, the radius of the arcuate path causes the pin 55 to raise the piston rod 38, swinging the cylinder 2 on its pivots 12, which swings the push rod upwardly and lifts the lug 80 over and clear of the pawl 75, permitting the foot 66 to remain in contact with the shoulder 67 of the lever 18. It will be noted that when the piston rod is forced in the direction of the arrow, Figure 1, the slot 57 permits the pin 55 to remain stationary at the start of the stroke of the rod 38 so that the lug 80 travels a straight path and engages the pawl 75 which swings the push rod 64 on its pivot 65 and disengages the foot 66 from the shoulder 67. This is one of the objects of the slot 57, although as stated above, another object of this slot is to give the arm 18 time to move from the position shown in Figure 1 to that shown in Figure 5, clamping the swage to the tooth before the arm 54 is moved in the swaging operation.

When the lever 54 is returned from the position shown in Figure 5 to the position shown in Figure 1, the end 74 of the connecting link 68 is brought under the friction washer 72 and, this end being thicker, an added resistance is offered to the movement of the lever 54 at the end of its stroke. This tends to slow the movement of the said lever 54 and the piston rod 38, reducing vibration or pounding at the end of the stroke, and at the same time resisting the movement of the lever 54 at the beginning of the movement of the piston rod in the direction of the arrow, Figure 1, when it is desired to have the rod operate along the slot 57, releasing the lever 18 as above described.

Restating briefly the operation of the swage, the first step of the swage is to release the lever 18, permitting the spring 60 to rotate the same from the position shown in Figure 1 to that shown in Figures 5, 6, 7 and 8. This locks the swage to the tooth, an operation which was formerly done by a lever operated by hand.

The next step is to move the lever 54 from the position shown in Figure 1 to that shown in Figures 5, 6, 7 and 8. This applies the swaging die 53 to the tooth of the saw, swaging the same. This lever is moved, as stated above, by the action of the piston rod 38. The next step after the tooth has been swaged is to return the piston rod to the position shown in Figure 1, returning the crank 18 through the action of the push rod 64, also returning the lever 54 to the position shown in Figure 1. As long as air is applied to the piston 37 by the pipe line 35, the lever will be held in the position shown until again released on the next tooth to be swaged, as indicated in Figure 5A.

In the operation of my swage, the swaging of each tooth takes place as quickly as the operating trigger 31 can be manipulated, and the raising and moving of the swage from one tooth to another, the operator holding the swage securely against the tooth while the swaging operation takes place, insuring a greater accuracy in the swaging of the tooth.

By the use of my new and improved power operated swage, considerably less manual effort is required than was heretofore required for the manually operated swage. By adding my new and improved power operated mechanism to the standard swage I am able to increase the speed of operation substantially, as well as reducing the manual effort in the operation of the same.

What I claim is:

1. The combination with a swage having die means for swaging a saw tooth, clamping means for securing the swage to the saw during the swaging operation, a lever operatively connected to said swage clamping means, a lever operatively connected with said die means for actuating said die means, a frame fixed to said swage, a fluid actuated cylinder mounted on said frame and including a piston rod extending beyond said cylinder and operatively connected with said die means lever, of a spring between said clamping means lever and said frame and biasing said lever to tighten said clamping means, a pawl on said swage, and means releasably connecting said piston rod and said clamping means lever and including an arm engageable with said pawl to release said latter connecting means before said connecting rod actuates said die means lever.

2. The combination set forth in claim 1 wherein said connecting means between said piston rod and die means lever has a lost motion to permit release of said means connecting said piston rod and clamping means lever prior to actuation of said die means lever.

3. The combination set forth in claim 2 comprising friction means carried by said frame and cooperative with said die means lever for restraining said lever during relative movement between said die means lever and said piston rod.

4. The combination with a swage having die means for swaging a saw tooth, clamping means for securing the swage to the saw during the swaging operation, a lever operatively connected to said swage clamping means, a lever operatively connected with said die means for actuating said die means, a frame fixed to said swage, a fluid actuated cylinder mounted on said frame and including a piston rod extending beyond said cylinder and operatively connected with said die means lever, of a spring between said clamping means lever and said frame and biasing said lever to tighten said clamping means, a pawl on said swage, and means releasably connecting said piston rod and said clamping means lever and including an arm engageable with said pawl to release said latter connecting means before said connecting rod actuates said die means lever, and a lost motion connection between said die means lever and said piston rod and including a segment on said lever having a slot on a radius of the pivotal axis of said lever, a pin adjustably mounted in said slot in fixed relation, said piston rod having a slot with said pin slidable therein, and a set screw threaded in said piston rod and extending longitudinally of said slot to limit the relative movement between said pin and said piston rod.

5. The combination set forth in claim 4 comprising friction means cooperative with said die means lever for restraining said lever during relative movement between said pin and said piston rod.

6. The combination set forth in claim 5 wherein said friction means comprises a slotted link pivotally connected to said die means lever, a stud on said frame and extending through the slot in said link, friction means on said stud and engaging said link, the free end of said link being thicker than the major portion thereof to increase the frictional engagement of said friction means.

7. The combination with a swage having die means for swaging a saw tooth, clamping means for securing the swage to the saw during the swaging operation, a lever operatively connected to said swage clamping means, a lever operatively connected with said die means for actuating said die means, a frame fixed to said swage, a fluid actuated cylinder mounted on said frame and including a piston rod extending beyond said cylinder and operatively connected with said die means lever, of a spring between said clamping means lever and said frame and biasing said lever to tighten said clamping means, a pawl on said swage, and means releasably connecting said piston rod and said clamping means lever and including an arm engageable with said pawl to release said latter connecting means before said connecting rod actuates said die means lever said clamping means lever including a cam portion and a shoulder, and said releasable means comprises a link pivotally connected to said piston rod, a shoe carried by said link for abutting said shoulder and a follower on said link and engaging said cam portion to guide said shoe into abutment with said shoulder, said pawl engaging arm being fixed on said link for lifting said shoe from said shoulder upon engagement of said arm with said pawl.

8. The combination set forth in claim 7 comprising a valve for controlling operation of said cylinder, a handle on said valve and a handle on said frame.

9. The combination set forth in claim 8 wherein said valve comprises a casing having a bore therein with said inlet and outlets opening into said bore, said valve member comprising a plunger slidable in said bore and having three sealing rings thereon respectively between and on opposite sides of said outlets, said sealing ring between said outlets being movable with said plunger between positions on opposite sides of said inlet.

10. The combination with a swage having die means for swaging a saw tooth, clamping means for securing the swage to the saw during the swaging operation, a lever operatively connected to said swage clamping means, a lever operatively connected with said die means for actuating said die means, a frame fixed to said swage, a fluid actuated cylinder mounted on said frame and including a piston rod extending beyond said cylinder and operatively connected with said die means lever, of a spring between said clamping means lever and said frame and biasing said lever to tighten said clamping means, a pawl on said swage, and means releasably connecting said piston rod and said clamping means lever and including an arm engageable with said pawl to release said latter connecting means before said connecting rod actuates said die means lever, a piston connected to said piston rod and operative in said cylinder, said piston having an exhaust port opening through opposite sides thereof, an exhaust passage extending from said port through said piston rod to the atmosphere, and a valve unit including a pair of valve washers on opposite sides of said piston and spacing means rigidly connecting said washers and slidable in said piston, said spacing means having a length greater than the axial thickness of said piston to space one washer from said piston and open one side of said port when the other washer engages said piston and closes that side of said port.

11. The combination with a swage having die means for swaging a saw tooth, clamping means for securing the swage to the saw during the swaging operation, a lever operatively connected with said die means, a lever operatively connected with said clamping means, a fluid actuated cylinder carried by said swage and including a piston rod, and means operatively connecting said piston rod with both said levers.

References Cited in the file of this patent

UNITED STATES PATENTS

| | | |
|---|---|---|
| 888,701 | Fox | May 26, 1908 |
| 948,197 | White | Feb. 1, 1910 |
| 1,824,349 | Horton et al. | Sept. 22, 1931 |
| 1,863,910 | Morey | June 21, 1932 |
| 2,190,920 | Hanchett | Feb. 20, 1940 |